United States Patent Office 3,222,405
Patented Dec. 7, 1965

3,222,405
PRODUCTION OF PER(CHLOROFLUORO)
BENZENES
Warren H. Powell, Woodland Heights, Wilmington, Del., assignor to E. I. du Pont de Nemours and Company, Wilmington, Del., a corporation of Delaware
No Drawing. Filed May 24, 1962, Ser. No. 197,271
6 Claims. (Cl. 260—650)

The present invention is directed to a process for converting per(chlorofluoro)cyclohexadienes to per(chlorofluoro)benzenes without loss of chlorine. More particularly, the present invention relates to a novel process wherein a per(chlorofluoro)cyclohexadiene containing from one to four chlorines is heated over certain metals to thereby obtain per(chlorofluoro)benzenes containing the same number of chlorines.

At present, no convenient methods are available for preparing the per(chlorofluoro)benzenes such as chloropentafluorobenzene, dichlorotetrafluorobenzene, trichlorotrifluorobenzene and tetrachlorodifluorobenzene. U.S. Patents Nos. 2,459,779 and 2,586,364 describe a method for converting certain perhalocyclohexanes, cyclohexenes and cyclohexadienes to perhalobenzenes using zinc or magnesium and a liquid medium. In general, chlorine is removed to form products such as chloropentafluorobenzene; this method leaves much to be desired since primarily chlorine is removed and thus does not allow the preparation of poly chlorinated per(chlorofluoro)benzenes.

It is, therefore, an object of this invention to provide a novel process for converting per(chlorofluoro)cyclohexadienes to per(chlorofluoro)benzenes.

It is a further object of this invention to provide a novel process wherein a per(chlorofluoro)cyclohexadiene containing from one to four chlorine atoms is heated over certain metals to thereby obtain per(chlorofluoro)benzenes, said benzene product retaining the original chlorine in the hexadiene molecule.

It is another object of this invention to provide a novel process which utilizes inexpensive metals for removing halogen from the per(chlorofluoro)cyclohexadienes.

These and other objects will become apparent in the following description and claims.

More specifically, the present invention is directed to a novel process for preparing per(chlorofluoro)benzenes, which process comprises passing a per(chlorofluoro)cyclohexadiene containing from one to four chlorines over a metal which reacts with fluorine to form a stable fluoride at a reaction temperature of at least 300° C. and recovering a per(chlorofluoro)benzene containing the same number of chlorines as the per(chlorofluoro)cyclohexadiene from the reaction mixture.

The present novel process utilizes per(chlorofluoro)-cyclohexadienes $C_6Cl_aF_{8-a}$, wherein $a$ is from one to four, as starting materials and gives per(chlorofluoro)-benzenes $C_6Cl_aF_{6-a}$ as products; thus $C_6ClF_7$ gives $C_6ClF_5$, $C_6F_6Cl_2$ gives $C_6F_4Cl_2$, $C_6F_5Cl_3$ gives $C_6F_3Cl_3$ and $C_6F_4Cl_4$ gives $C_6F_2Cl_4$. These may be the per(chlorofluoro) derivatives of either 1,3-cyclohexadiene or 1,4-cyclohexadiene.

The present process converts $C_6Cl_aF_{8-a}$ to $C_6Cl_aF_{6-a}$; thus the process essentially removes two fluorine atoms from the cyclohexadiene to form the benzene. It is unexpected that fluorine is removed in preference to chlorine for chlorine is known to be far more reactive than fluorine in most situations of this sort. It has been discovered as a result of the present novel process that essentially none of the chlorine contained in the cyclohexadiene starting materials is removed in forming the benzene derivatives. The per(chlorofluoro)cyclohexadienes utilized in the process of the present invention should be essentially free of hydrogen for a chlorofluorocyclohexadiene containing hydrogen will lose some of its chlorine as hydrogen chloride during the present process.

The per(chlorofluoro)benzenes can occur in several isomeric forms. For example, dichlorotetrafluorobenzene ($C_6F_4Cl_2$) has ortho, meta and para isomers. Trichlorotrifluorobenzene has three isomeric forms: 1,2,3-, 1,2,4-, and 1,3,5-trichlorotrifluorobenzenes. Likewise, difluorotetrachlorobenzene has ortho, meta and para isomers. All of these isomeric products, as well as chloropentafluorobenzene, are obtained by use of the present process. To obtain a particular isomer, it is necessary that the per(chlorofluoro)cyclohexadiene contains chlorine atoms in the same relative positions. For example, to obtain 1,2,4-trichlorotrifluorobenzene, a trichloropentafluorocyclohexadiene with chlorines in the relative positions 1,2,4 is used. Similar considerations apply to the preparation of the other isomeric dichlorotetrafluorobenzenes, trichlorotrifluorobenzes, and tetrachlorodifluorobenzenes as will be apparent to those skilled in the art.

The present process comprises heating a per(chlorofluoro)cyclohexadiene $C_6Cl_aF_{8-a}$ over a metal which forms a stable fluoride by reaction with fluorine at at least 300° C. Metals which react with fluorine at temperatures lower than 300° C. are not suitable in this process. Useful metals include iron, nickel, cobalt, copper and the like and alloys of these such as steel, stainless steel and the like. Metals such as the alkali metals, the alkaline earth metals, zinc, aluminum and their kin react below 300° C. and are therefore unsuitable. They are far too reactive, causing the loss of chlorine from the product, and lead to complete decomposition of the starting materials. The metals may be used in the form of gauze, wire, turnings, powder, wool, or the like; such forms have large surface areas which can be exposed to the per(chlorofluoro)cyclohexadiene reactant. The wool form is generally preferred.

The reaction is usually carried out in a flow system. A sweep of inert gas such as nitrogen is usually used in a flow system although it is not essential. The reaction temperature may vary from about 300° C. to about 600° C. Reaction may occur somewhat below 300° C. but it is too slow to be useful. Above about 600° C. such severe decomposition with intolerably large yield losses occurs that the process becomes unattractive. Residence times may vary from one-half minute to 20 minutes. Short residence times result in low conversions with high yields while residence times near the maximum result in high conversions but low yields. At high residence times, some decomposition occurs, particularly at higher temperatures. Residence times are usually varied inversely with temperature for best results.

The preferred residence time is about four minutes. The preferred reaction temperature varies with the type of starting material used. These may be summarized as follows: $C_6F_7Cl$ 380–390° C., $C_6F_6Cl_2$ 370–390° C., $C_6F_5Cl_3$ 360° C., $C_6F_4Cl_4$ 350° C. It is readily apparent that the preferred reaction temperature decreases as the chlorine content of the per(chlorofluoro)cyclohexadiene increases. Why this should be the case is not known since chlorine is not removed from the molecule.

Conversion under constant conditions usually decreases with time, apparently due to the coating of the reactive metal with metal fluoride. For this reason it is desirable to use the metal in a form having a very high surface area per unit weight. The metal fluoride coating can be removed by heating periodically with hydrogen. This treatment reduces the salt to the free metal and hydrogen fluoride.

There is some variation in the methods used to calculate residence times. In the present process, residence times are calculated by first determining the reactor volume which is at the reaction temperature (those parts of the reactor at both ends which were heated but below the reaction temperature are ignored). From this volume is deducted the volume of the reactive metal (the weight of metal divided by the density of the metal). The volume of material passing through the reactor per unit time is calculated using the perfect gas law, i.e., $$\frac{\text{total volume}}{\text{unit time}} = \frac{V\ (\text{inert gas})}{\text{unit time}} + \frac{\text{volume (reactant)}}{\text{unit time}}$$

$$= \frac{V\ (\text{inert gas; room temperature})\,T_r}{\text{unit time } 298} + \frac{WRT_r}{MP}$$

where $T_r$ is the reaction temperature in ° K. (° C. +273), W is the feed rate of reactant in mass per unit time, M is the molecular weight of the reactant, P is the reaction pressure (usually one atmosphere) and R is the gas constant in proper units. Dividing the reactor volume by the thus calculated flow in volume per unit time gives the time.

Some of the starting materials utilized in the practice of the present invention are known to the art. One convenient method for preparing these compounds is reacting chloranil (2,3,5,6 - tetrachloro - 1,4 - benzoquinone) with sulfur tetrafluoride according to the method of Hasek, Smith and Engelhardt, J. Amer. Chem. Soc., 82, 543 (1960), to give tetrachlorotetrafluorocyclohexadiene (B.P. 183–188° C.) and trichloropentafluorocyclohexadiene (B.P 149–159° C.). Tetrachlorotetrafluorocyclohexadiene is then treated with potassium fluoride in N-methylpyrrolidone solution at 150–250° C., using the general reaction procedure described in the Maynard application Serial No. 93,860, filed March 7, 1961, giving chloroheptafluorocyclohexadiene (B.P. 86–95° C.) and dichlorohexafluorocyclohexadiene (B.P. 120–128° C.). Thus, starting materials containing one, two, three and four chlorines are available from a single source material, chloranil, which is commercially available. The present process, however, is not limited to starting materials from any particular source.

The following specific hexadienes may be utilized:

1-chloroheptafluoro-1,3-cyclohexadiene,
1-chloroheptafluoro-1,4-cyclohexadiene,
2-chloroheptafluoro-1,3-cyclohexadiene,
1,2-dichlorohexafluoro-1,4-cyclohexadiene,
1,3-dichlorohexafluoro-1,4-cyclohexadiene,
1,5-dichlorohexafluoro-1,4-cyclohexadiene,
1,2-dichlorohexafluoro-1,3-cyclohexadiene,
1,3-dichlorohexafluoro-1,3-cyclohexadiene,
1,4-dichlorohexafluoro-1,3-cyclohexadiene,
1,2,4-trichloropentafluoro-1,3-cyclohexadiene,
1,2,4-trichloropentafluoro-1,4-cyclohexadiene,
1,2,3,4-tetrachlorotetrafluoro-1,3-cyclohexadiene and
1,2,4,5-tetrachlorotetrafluoro-1,4-cyclohexadiene.

GENERAL PROCEDURE

The flow system used consisted of a three and one-half inch I.D. by four foot schedule 40 nickel pipe fitted with "Monel" flanges sealed with polytetrafluoroethylene ("Teflon") O-rings. The pipe was heated with six six-inch band heaters, each automatically controlled. To one end of the reactor, acting as the inlet was attached an assembly which allowed dropwise addition of the per(chlorofluoro)cyclohexadiene starting material onto a heated glass surface (preheater) where it was vaporized. The vaporized starting material was swept into the reactor itself by a stream of dry nitrogen, fed into the preheater through a flow-meter. The outlet end of the reactor was connected to two nickel gate valves in parallel, one leading to an exhaust system and the other to a series of refrigerated traps and a flow meter. A thermowell extended the entire length of the reactor at the axis of the cylindrical pipe. The heated zone of the reactor was filled with 2.5–3.5 kg. of steel wool. The reactor temperatures cited are the average temperatures of the six heated sections. For purposes of computing the contact times, the reaction zone was considered to be that volume of reactor between the center of the first heater to the center of the last heater.

Example I

A series of reactions was carried out with chloroheptafluorocyclohexadiene (B.P. 86–95° C.) at various temperatures and residence times in the reaction system described above. The reaction conditions and results are tabulated below. The products were analyzed, for convenience, by vapor phase chromatography.

| Run No. | Reaction Temp., ° C. | Addition Rate, g./hr. | Residence Time, min. | Percent Conversion of $C_6F_7Cl$ | Percent Yield of $C_6F_5C$ |
|---|---|---|---|---|---|
| 1a | 400±2 | 12 | 8 | 97 | 34 |
| 2 | 411±6 | 6 | 8 | 97 | 15.5 |
| 3 | 406±2 | 6 | 4 | 98 | 55 |
| 4 | 383±3 | 6 | 5 | 86 | 79 |
| 5 | 371±3 | 4 | 4 | 65 | 88 |
| 6 | 382±5 | 6 | 4 | 58 | 83 |
| 7 | 363±2 | 8 | 4 | 74 | 47 |
| 8a | 390 | 18 | 7 | 54 | 94 |
| 9 | 390 | 19 | 4 | 77 | 90 |
| 10 | 375 | 19 | 4 | 72 | 90 |
| 11 | 360 | 16 | 4 | 77 | 86 |
| 12 | 340 | 19 | 4 | 66 | 89 |
| 13 | 320 | 19 | 4 | 48 | 94 |
| 14 | 330 | 20 | 4 | 34 | 94 |
| 15 | 350 | 20 | 4 | 32 | 88 | a Fresh steel wool packing used.

Example II

This reaction with chloroheptafluorocyclohexadiene (B.P. 86–95° C.) was carried out in the system described above at 390° C. Steel wool (2.5–3.5 kg.) was used. Samples were withdrawn from the process stream at the times indicated and analyzed by vapor phase chromatography. The feed rate was 20 grams per hour; the residence time was about four minutes and the yield was about 90–95% throughout; the effect of total reaction time on conversion is shown below.

| Amount $C_6F_7Cl$ added, g.: | Relative conversion of $C_6F_7Cl$ |
|---|---|
| 70 | 73 |
| 140 | 70 |
| 215 | 58 |
| 290 | 61 |
| 345 | 58 |
| 400 | 54 |
| 456 | 47 |

Obviously, the conversion decreases steadily with time. This factor has to be taken into account when considering the results shown in the first example.

Example III

A series of reactions was carried out with the different starting materials indicated as follows in the apparatus described heretofore.

| Starting Material | Reaction Temperature, °C. | Residence Time, Min. | Addition Rate, g./hour | Product (Properties) | Percent Conversion |
|---|---|---|---|---|---|
| $C_6F_7Cl$, B.P. 86–95° C | 390 | 4 | 20 | $C_6F_5Cl$ (B.P. 117–118° C.) ($n_D^{25}$ 1.4206) | 52 |
| $C_6F_6Cl_2$, B.P. 120–128° C | 375 | 4 | 21 | $C_6F_4Cl_2$ [B.P. 157–159° 4% ortho 66% meta 30% para $n_D^{25}$ 1.4670] | 57 |
| $C_6F_5Cl_3$, B.P. 149–159° C | 360 | 4 | 18 | $C_6F_3Cl_3$ (B.P. 90–93°/22) (1,2,4-isomer) | 56 |
| $C_6F_4Cl_4$, B.P. 188° C | 350 | 4 | 20 | $C_6F_2Cl_4$ (M.P. 75–76° C.) (1,4-isomer) | 61 |

Although the preceding reaction products were analyzed for convenience by vapor phase chromatography, they are readily separated from their respective mixtures by fractional distillation or the like. As noted, most were isolated in the pure state and their physical properties determined. The preceding reactions were carried out on a relatively small scale but there is no difficulty in scaling-up the process to any size desired.

The preceding representative examples may be varied within the scope of the present total specification disclosure, as understood and practiced by one skilled in the art to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for preparing per(chlorofluoro)benzenes, which process comprises passing a per(chlorofluoro)cyclohexadiene containing from one to four chlorines over a metal which reacts with fluorine to form a stable fluoride, said metal being one selected from the class consisting of iron, nickel, cobalt, copper and steel, said process being conducted at a reaction temperature of from at least about 300° C. to about 390° C. for a time of from about 4 minutes to about 7 minutes, and recovering from the reaction mixture the resulting per(chlorofluoro)benzene, said resulting benzene compound containing the same number of chlorine atoms as the said per(chlorofluoro)cyclohexadiene compound.

2. The process of claim 1 wherein the metal is steel in the form of steel wool.

3. Claim 1 wherein chloroheptafluorocyclohexadiene is utilized at about 380–390° C. and about 4 minutes residence time.

4. Claim 1 wherein dichlorohexafluorocyclohexadiene is utilized at about 370–390° C. and about 4 minutes residence time.

5. Claim 1 wherein trichloropentafluorocyclohexadiene is utilized at about 360° C. and about 4 minutes residence time.

6. Claim 1 wherein tetrachlorotetrafluorocyclohexadiene is utilized at about 350° C. and about 4 minutes residence time.

References Cited by the Examiner

Coe et al., "Tetrahedron," vol. 9, pp. 240–245 (1960).

LEON ZITVER, *Primary Examiner.*

DANIEL E. WYMAN, *Examiner.*